United States Patent Office 3,631,027
Patented Dec. 28, 1971

3,631,027
CEPHALOSPORANIC ACIDS
Leonard Bruce Crast, Jr., Clay, N.Y., assignor to Bristol-Myers Company, New York, N.Y.
No Drawing. Filed Mar. 27, 1970, Ser. No. 23,440
Int. Cl. C07d 99/24
U.S. Cl. 260—239.1      6 Claims

ABSTRACT OF THE DISCLOSURE

7-[α-(1-substituted)-3 or 4-pyridylthio)acetamido] cephalosporanic acid betaines are valuable antibacterial agents for use in mammals, including man. The compound 7-[α-(1-methyl-4-pyridylthio)acetamido]cephalosporanic acid betaine is of particular interest for its excellent antibacterial spectrum and potency. The compound is prepared by mixing together equimolar quantities of 7-[α-(4-pyridylthio)acetamido]cephalosporanic acid and methyl iodide in the presence of a tertiary amine.

BACKGROUND OF THE INVENTION

(1) Field of the invention

The compounds of the invention are useful antibacterial agents.

(2) Description of the prior art (A) The compounds 7-[α(4-pyridylthio)acetamido]-cephalosporanic acid and 7-[α-(-pyridylthio)acetamido] cephalosporanic acid are compounds claimed in U.S. Pat. No. 3,422,100.

(B) The compound 7-[α-(1-oxo-4-pyridylthio)-acetamido]cephalosporanic acid is disclosed in Japanese Pat. No. 16,952/66.

None of the prior art is believed to be anticipatory of the compounds of the instant invention.

SUMMARY OF THE INVENTION

The compounds of the instant invention are characterized as having the formula

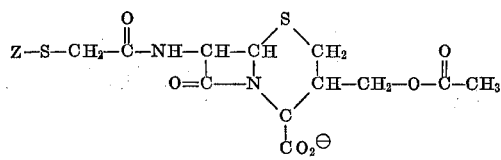

wherein Z is a radical of the formula

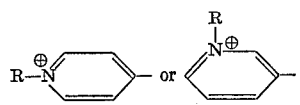

in which R is (lower)alkyl, (lower) alkenyl or (lower) alkynyl.

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by gram-positive and gram-negative bacteria and, more particularly, relates to certain 7-[α-(1-substituted) pyridylthio)acetamido]cephalosporanic acid betaines, and to a process for the preparation of same.

Antibacterial agents in the past have proven highly effective in the therapy of infections due to either gram-positive or gram-negative bacteria but few are effective against both. It was the objective of the present invention to provide novel compounds effective against both gram-positive and gram-negative bacteria including resistant strains.

It was a further object of the present invention to provide cephalosporins active against gram-positive and gram-negative bacteria which are also efficiently absorbed upon parenteral and/or oral administration to man and animals.

The objects of the present invention have been achieved by the provision, according to the present invention, of the compounds of the formula

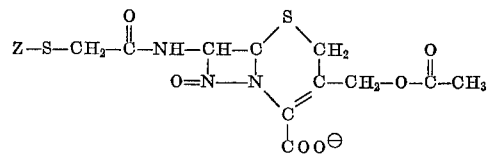

wherein Z is a radical of the formula

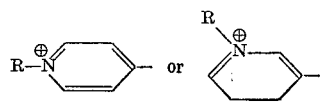

in which R is (lower)alkyl, (lower)alkenyl or (lower) alkynyl.

The term (lower)alkyl as used herein means both straight and branched chain aliphatic hydrocarbon radicals having from 1 to 5 carbon atoms such as methyl, ethyl, n-propyl, isopropyl, n-butyl, sec-butyl, n-pentyl and the like, but most particularly preferred are the alkyl groups methyl, ethyl and n-propyl.

The term "(lower)" as used herein when applied to other moieties, e.g., (lower)alkynyl and (lower)alkenyl, shall have the same meaning as when used in (lower) alkyl but shall contain 2 to 5 carbon atoms. Preferred (lower)alkenyl and (lower)alkynyl groups are allyl and propargyl.

A preferred embodiment of the present invention is the compounds having the formula

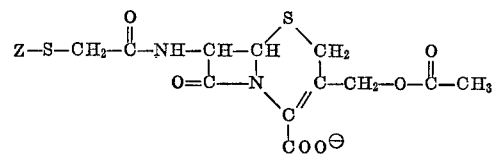

wherein Z is a radical of the formula

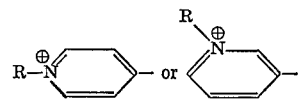

in which R is (lower)alkyl, (lower)alkenyl or (lower)alkynyl.

Another preferred embodiment is the compounds of the Formula I wherein R is (lower)alkyl, allyl, or propargyl.

A more preferred embodiment is the compounds of the formula

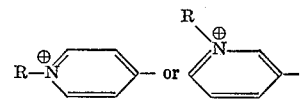

wherein R is methyl, ethyl, propargyl or allyl.

A still more preferred embodiment is the compounds of Formula I wherein Z is a radical of the formula

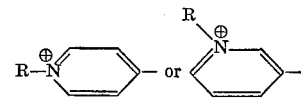

in which R is methyl or allyl.

A most preferred embodiment is the compound of Formula I wherein Z is a radical of the formula

Another most preferred embodiment is the compound of Formula I wherein X is a radical of the formula

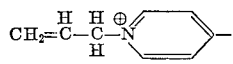

The objects of the present invention have been achieved by the provision, according to the present invention, of the process for the preparation of the compounds having the formula

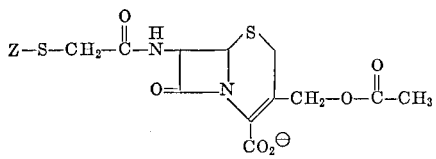

wherein Z is a radical of the formula

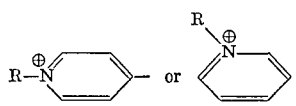

in which R is (lower)alkyl, (lower)alkenyl or (lower)alkynyl; which process comprises treating a compound having the formula

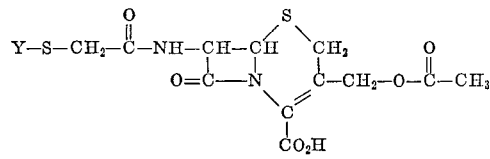

wherein Y is 3 or 4-pyridyl; or a cationic salt thereof, with a (lower)alkyl, (lower)alkenyl or (lower)alkynyl alkylating agent selected from the group comprising a (lower)alkyl, (lower)alkenyl or (lower)alkynyl chloride, bromide or iodide, a (lower)alkyl p-toluenesulfonate ester, a di(lower)alkylsulfate, or their equivalents, but preferably a (lower)alkyl, (lower)alkynyl or (lower)alkenyl halide or a (lower)alkyl p-toluenesulfonate, and most preferably a (lower)alkyl, (lower)alkynyl or (lower)alkenyl iodide, in a molar ratio of at least 0.9 mole of alkylating agent per mole of compound I, but preferably in a ratio of about 0.9 mole to about 1.2 moles of alkylating agent per mole of compound I, and most preferably in a ratio of about 1 to about 1.1 moles of alkylating agent per mole of compound I, in an organic solvent, preferably selected from the group comprising a (lower)alkanol, acetone, methyl ethyl ketone, chlorobenzene, ethyl acetate, chloroform, dichloromethane, benzene, isobutyl acetate, propyl chloride, dichloroethane, acetonitrile, acrylonitrile, nitromethane, formamide, dimethylformamide, and the like, or mixtures thereof, or in a water-water miscible organic solvent system, preferably selected from the group comprising water in combination with a (lower)alkanol, acetone, tetrahydrofuran, dimethylformamide, formamide, acetonitrile, and the like, in the presence of an acid inactivating base, preferably an organic base selected from the group comprising trimethylamine, triethylamine, N,N diisopropylethylamine and the like, or an inorganic base, preferably selected from the group comprising alkali metal or alkaline earth metal hydroxides, carbonates or bicarbonates, said base being present in a molar ratio of 1 mole of base per mole of alkylating agent used, at a temperature in the range of about $-10°$ C. to about $70°$ C., but preferably in the range of about $10°$ C. to about $45°$ C., and most preferably at about room temperature ($22°$ C.) to produce the product I.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three of four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The preferred route of administration is parenteral administration.

The compounds of the present invention are characterized as possessing improved antibacterial properties. In addition, they are water soluble, thus facilitating administration in parenteral solution.

7-[α-(1-methyl - 4 - pyridylthio)acetamido]cephalosporanic acid betaine (X) in particular, is significantly more active than its parent, 7-[α (4-pyridylthio)acetamido]cephalosporanic acid (XI) against a selected variety of gram-positive and gram-negative bacteria. The differences are illustrated below in Chart I. Sodium cephalothin (XII) is included for reference purposes.

CHART I.—MINIMUM INHIBITORY CONCENTRATIONS (MIC)

[in mcg./ml.]

| Organism | Compound | | |
|---|---|---|---|
| | X | XI | XII |
| D. pneumoniae plus 5% serum | .008 | .04 | .08 |
| St. pyogenes | .006 | .04 | .08 |
| S. aureus Smith | 0.16 | .08 | 0.16 |
| A. aureus BX1633-2 | 0.3 | 0.16 | 0.3 |
| Sal. enteritidis | 2 | 0.16 | 0.3 |
| E. coli Juhl | 1 | 8 | 16 |
| E. coli | 2 | 16 | 32 |
| K. pneumoniae | ≤0.5 | 0.6 | 2 |
| K. pneumoniae | 1 | 2 | 16 |
| Pr. mirabilis | ≤0.5 | 1 | 1 |
| Pr. morganii | >250 | >250 | >250 |
| Ps. aeruginosa | >250 | >250 | >250 |
| Ser. rarcescens | >250 | >250 | >250 |

It is apparent from the chart that compound X has lower MIC's than compounds XI and XII against the majority of these organisms.

STARTING MATERIALS (A) The compound 7-[α - (4-pyridylthio)acetamido] cephalosporanic acid and the process for its preparation is described in Example 3 of U.S. Pat. No. 3,422,100.

(B) The compound 7 - [α-(3-pyridylthio)acetamido] cephalosporanic acid and the process for its preparation is described in Example 5 of U.S. Pat. No. 3,422,100.

(C) The compound sodium 7-[α bromoacetamido] cephalosporanate and the process for its preparation is described in Example 1 of U.S. Pat. No. 3,422,100.

(D) Preparation of 7 - [α-(2-pyridylthio)acetamido] cephalosporanic acid: 2-mercaptopyridone (1.11 g., 0.01 mole) and 1.06 g. (0.01 mole) of sodium carbonate dissolved 25 ml. of water were slowly added to a stirred solution of 4.15 g. (0.01 mole) of sodium 7-[α-bromoacetamido)cephalosporanate dissolved in 25 ml. of water over a 45 minute period at $22°$ C. One hour later, 50 ml. of ethyl acetate was added, then 40% phosphoric acid was added with stirring until pH 2.5 was obtained. The ethyl acetate extract was washed once with water, dried 15 minutes over $Na_2SO_4$, filtered and concentrated in vacuo at $20°$ C. to a volume of about 20 ml. Scratching the inside of the flask with a glass stirring rod induced crystallization and 30 minutes later 1.7 g. of product was collected by filtration. The crystals were washed with ethyl acetate and air dried. Recrystallization from acetone-water gave 1.45 g. of the title product; decomposition $140°$ C.

Analysis.—Calc'd for $C_{17}H_{17}N_3O_6S_2 \cdot H_2O$ (percent): C, 46.26; H, 4.35; N, 9.53. Found (percent): C, 46.37; H, 4.63; N, 9.33.

EXAMPLES

Preparation of 7-[α-(1-methyl-4-pyridylthio)acetamido]cephalosporanic acid betaine

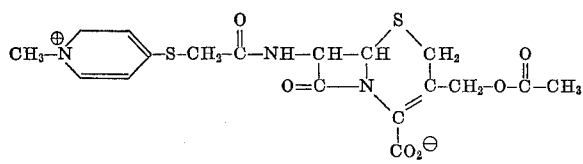

N,N-diisopropylethylamine (1.29 g., 0.01 mole) was added to a stirred suspension of 4.23 g. (0.01 mole) of 7-[α-(4-pyridylthio)acetamido]cephalosporanic acid in 50 ml. of dichloromethane and 10 ml. of acetone. After 5 minutes the solids dissolved and 1.42 g. (0.01 mole) of methyl iodide was added to the resultant solution. After 4 hours stirring at 22–30° C., the ppt. was filtered off, washed thoroughly with methylene chloride and air dried. The yield was 1.15 g. of title product, M.P. with decomposition at 150° C.

EXAMPLE 2

Preparation of 7-[α-(1-methyl-4-pyridylthio)acetamido]cephalosporanic acid betaine Triethylamine (0.02 mole) was added to a stirred suspension of 8.46 g. (0.02 mole) of 1-[α-(4-pyridylthio)acetamido]cephalosporanic acid in 50 ml. of dichloromethane and 10 ml. of acetone.

After the solids dissolved, 2.82 g. (0.02 mole) of methyl iodide was added to the resultant solution. The solution was stirred for 18 hours at 22–30° C. to produce 5.5 g. of crystalline title product, M.P. with decomposition at 140° C.

A purified crystalline sample of the title product was obtained by dissolving 2 g. of the product obtained above in 20 ml. of water and 10 ml. of acetone. 1.5 g. of "Darko KB" (decolorizing carbon) was added to the solution and the mixture was stirred for 15 minutes. The mixture was filtered and the filtrate diluted to its cloud point with acetone. Scratching the inside of the beaker with a glass stirring rod induced crystallization and after 2 hours the white crystalline material was collected by filtration, washed with acetone and air dried to produce a yield of 1.2 g. of title product; M.P. with decomposition at 160° C. (darkening above 100° C.).

*Analysis.*—Calc'd for $C_{18}H_{19}N_3O_6S_2$ (percent): C, 49.43; H, 4.39; N, 9.61. Found (percent): C, 49.31; H, 4.49; N, 9.87.

(Corrected for 4.88% $H_2O$ determined by the Karl Fischer method.)

EXAMPLE 3

*Alternate procedure for the preparation of 7-[α-(1-methyl-4-pyridylthio)acetamido]cephalosporanic acid betaine*

Substitution in the procedure of Example 1 for the 50 ml. of dichloromethane and 10 ml. of acetone used therein of 60 ml. of acetone and 10 ml. of water produced 1.5 g. (34%) of title product comparable to the quality of the purified sample obtained in Example 2.

EXAMPLE 4

*Alternate procedure for the preparation of 7-[α-(1-methyl-4-pyridylthio)acetamido]cephalosporanic acid betaine*

Substitution in the procedure of Example 1 for the methyl iodide, dichloromethane and acetone used therein of 1.86 g. (0.01 mole) of methyl p-toluenesulfonate, 60 ml. of acetone and 10 ml. of water produced 1.2 g. of title product of slightly lower purity than that obtained in Example 4.

EXAMPLE 5

*Preparation of 7-[α-(1-methyl-3-pyridylthio)acetamido]-cephalosporanic acid betaine*

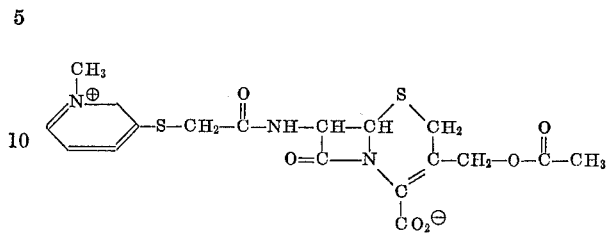

7-[α-(3-pyridylthio)acetamido]cephalosporanic acid (6 g.) was suspended in a mixture of acetone (20 ml.) and methylene chloride (50 ml.). N,N-diisopropylethylamine (1.93 g.) was added to the stirred suspension which subsequently turned to a solution upon completion of the addition of the amine. Methyl iodide (2.1 g.) was added and the mixture was stirred for 24 hours. The solids which formed were collected by filtration and washed with a small quantity of methylene chloride. The solids were dissolved in a minimum amount of 50% acetone-water and stirred for 10 minutes with "Darko KB" (decolorizing carbon, 0.5 g.). The mixture was filtered and acetone was added to the filtrate until precipitation of the product occurred. The title product was obtained in 7% yield (420 mg.); M.P. with decomposition at 100° C. The IR (infrared) and NMR (nuclear magnetic resonance) spectra were consistant with the structure.

EXAMPLE 6

*Alternate procedure for the preparation of 7-[α-(1-methyl-4-pyridylthio)acetamido]cephalosporanic acid betaine*

Sodium 7-[α-(4-pyridylthio)acetamido]cephalosporanate (0.01 mole) is placed in a mixture of 60 ml. of acetone and 10 ml. of water. Methyl iodide (0.01 mole) is added with stirring. The product forms and is collected by filtration. The product is identical to that obtained in Example 3.

EXAMPLE 7

*Preparation of 7-[ -(1-allyl-4-pyridylthio)acetamido]-cephalosporanic acid betaine*

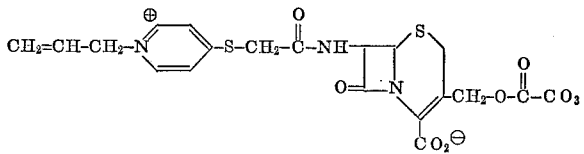

7 - [α - (4 - pyridylthio)acetamido]cephalosporanic acid (4.23 g., 0.01 mole) was dissolved in 1.3 g. (0.01 mole) of N,N-diisopropylethylamine, 40 ml. of acetone and 5 ml. of water. Allyl iodide (1.68 g., 0.01 mole) was added with stirring. After three hours, acetone was slowly added with stirring to a volume of about 100 ml. An oil separated out of solution and was collected by decanting off the supernatant liquids. The oil was triturated with fresh acetone and a solid formed which was collected by filtration. The solid was redissolved in a minimum quantity of 3:1 acetone-water, then treated with "Darko KB" (decolorizing carbon, 0.5 g.) for 5 minutes, then filtered. Acetone was slowly added to the filtrate to re-precipitate the product; yield was 900 mg./M.P. with decomposition at about 110° C. The IR and NMR spectra were consistant with the structure.

The title compound possessed the following minimum inhibitory concentrations:

| | |
|---|---|
| D. pneumoniae+5% serum | .004 |
| St. pyrogenes | .004 |
| S. aureus Smith | .08 |
| S. aureus Smith+50% serum | 0.16 |
| S. aureus BX1633-2 | 0.1 |
| Sal. enteritidis | 1 |
| E. coli Juhl | 2 |
| E. coli | 4 |
| K. pneumoniae | 1 |
| K. pneumoniae | 2 |
| Pr. mirabilis | 1 |

EXAMPLE 8

*Preparation of 7-[α-(1-propargyl-4-pyridylthio)acetamido]cephalosporanic acid betaine*

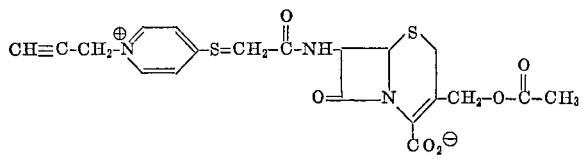

Substitution in the procedure of Example 7 for the allyl iodide used therein of an equimolar quantity of propargyl bromide produces the title compound.

EXAMPLE 9

Preparation of 7-[α-(1-ethyl-4-pyridylthio) acetamido]-cephalosporianic acid betaine Substitution in the procedure of Example 1 for the methyl iodide used therein of an equimolar quantity of ethyl iodide produced 300 mg. of the title produce, M.P. with decomposition about 130° C.

The IR and NMR spectra were consistent with the structure.

I claim:
1. A compound having the formula

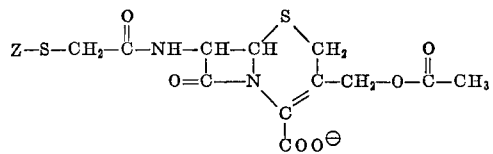

wherein Z is a radical of the formula

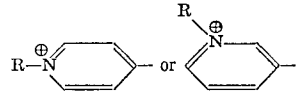

in which R is (lower)alkyl, (lower)alkenyl or (lower)alkynyl.

2. The compounds of claim 1 wherein R is (lower)-alkyl, allyl or propargyl.

3. The compounds of claim 1 wherein R is methyl, ethyl, propargyl or allyl.

4. The compounds of claim 1 wherein R is methyl or allyl.

5. The compound of claim 1 wherein Z is a radical of the formula

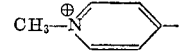

6. The compound of claim 1 wherein Z is a radical of the formula

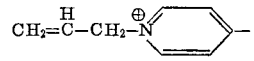

References Cited

UNITED STATES PATENTS 3,422,100   1/1969   Crast _____ 260—243 C

NICHOLAS S. RIZZO, Primary Examiner

U.S. Cl. X.R.

424—246